United States Patent [19]

Ayres

[11] 4,360,483
[45] Nov. 23, 1982

[54] APPARATUS FOR AND METHOD OF PRESSING PLASTIC SHEETS

[75] Inventor: Ronald L. Ayres, Saugus, Calif.

[73] Assignee: PPG Industries, Inc., Pittsburgh, Pa.

[21] Appl. No.: 291,159

[22] Filed: Aug. 10, 1981

[51] Int. Cl.³ .................... B29C 17/00; B29C 1/00
[52] U.S. Cl. .................... 264/2.7; 249/134; 264/293; 264/320; 264/337; 425/385; 425/394; 425/403; 425/411
[58] Field of Search ............ 264/2.7, 293, 320, 322, 264/337; 249/134; 425/385, 394, 403, 411, 470

[56] References Cited

U.S. PATENT DOCUMENTS

| 3,562,383 | 2/1971 | Ayres | 264/296 |
| 3,632,841 | 1/1972 | Fortin | 264/1 |
| 3,668,053 | 6/1972 | Ayres | 161/118 |
| 3,681,483 | 8/1972 | Moore | 264/1 |
| 3,784,655 | 1/1974 | Lewchuk et al. | 264/1 |
| 3,808,077 | 4/1974 | Rieser et al. | 156/102 |
| 3,856,498 | 12/1974 | Campagna et al. | 65/60 |
| 3,912,790 | 10/1975 | Chang et al. | 260/849 |
| 3,937,863 | 2/1976 | Moore | 428/410 |
| 4,147,679 | 4/1979 | Scriven et al. | 260/29.2 T N |
| 4,231,827 | 11/1980 | Wilson et al. | 156/214 |
| 4,268,554 | 5/1981 | Gras | 428/35 |

FOREIGN PATENT DOCUMENTS 857789 12/1970 Canada .......................... 264/2.7

*Primary Examiner*—James B. Lowe
*Attorney, Agent, or Firm*—Donald Carl Lepiane; Lee Patch

[57] ABSTRACT

A peripheral edge-containing member is provided to reduce the length of the projectile path of fragmented particles expelled outwardly from the peripheral edge of a frangible pressing plate which is broken during the press-stretching or press-polishing of acrylic sheets. The acrylic sheets are fabricated for use in light weight transparencies.

12 Claims, 4 Drawing Figures

APPARATUS FOR AND METHOD OF PRESSING PLASTIC SHEETS

FIELD OF THE INVENTION

This invention relates to pressing plastic sheet between pressing plates, and more particularly, to press-stretching and/or press-polishing the surface of a plastic sheet between glass pressing plates.

DISCUSSION OF THE TECHNICAL PROBLEM

It is known in the fabrication of light-weight transparencies, e.g., aircraft transparencies, to utilize at least one sheet of a plastic sheet, e.g., acrylic, either monolithically or as part of a laminate structure.

In general, a plastic sheet may be formed from an as-cast acrylic blank by press-stretching the acrylic blank between a pair of complementarily shaped pressing plates to a required useable thickness. The optical properties of the plastic sheet may be improved by pressing it at an elevated temperature and pressure between a pair of complementarily shaped pressing plates having opposed optically smooth surfaces to minimize surface deformations. For a detailed description of these techniques, reference may be had to U.S. Pat. Nos. 3,632,841 to Fortin and 3,681,483 to Moore. Pressing plates employed in the above-mentioned techniques are commonly formed of glass sheets because glass may conveniently be formed to have the desired surface smoothness.

Due to the elevated pressures reached during press stretching and/or press polishing and in the interest of durability, the glass pressing plates are generally tempered for increased strength. However, tempered glass, if broken, tends to explode into a large number of relatively small particles, e.g., one-half inch diameter (1.27 cm.). During press stretching and/or press polishing, the peripheral edges of the tempered glass pressing plates are generally exposed. When the tempered glass pressing plates are broken under pressure, e.g., during press-stretching or press-polishing, a number of the relatively small glass particles are forcefully expelled outwardly from the exposed peripheral edges, and depending upon the pressure being utilized, have been known to travel up to thirty feet (10 meters). This type of occurrence, of course, poses personnel safety problems as well as substantial clean-up burdens.

In addition, the exposed peripheral edges of tempered glass pressing plates may be damaged during the handling to which they are subjected. Minor edge damage may lead to fracture during subsequent pressing operations.

In view of the above, it would be advantageous to provide an apparatus for and a method of press-stretching and press-polishing a plastic sheet which diminishes or eliminates the limitations presently associated with utilizing tempered glass pressing plates.

SUMMARY OF THE INVENTION

The present invention provides an apparatus for and a method of applying pressure to opposed major surfaces of a plastic sheet with a pair of complementarily shaped pressing plates, at least one of which is formed of a fracturable material, e.g., tempered glass. An adhering material, e.g., a silicone adhesive, is applied to exposed portions of the peripheral edge of the fracturable pressing plate to form an edge-containing layer therearound to reduce the length of the projectile path of particles which are outwardly expelled from the peripheral edge when breakage occurs. In this convenient and cost-effective manner, operational safety is improved and the burden of cleaning up a broken pressing plate is substantially diminished. In addition, the peripheral edges of the pressing plate is protected from much damage which might occur during handling by the interposition of the edge-containing layer.

DESCRIPTION OF THE INVENTION

Figure 1:
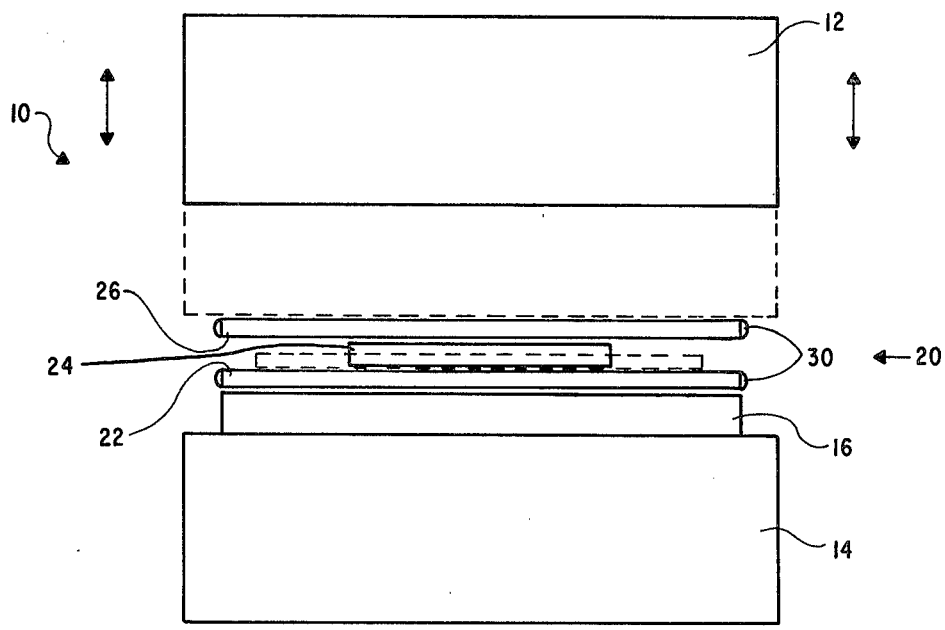
FIG. 1 is a partly schematic side elevated view of apparatus suitable for press-stretching or press polishing a plastic sheet, incorporating features of the present invention.

With reference to FIG. 1, there is shown a press 10 having an upper pressing platen 12 and a lower pressing platen 14 mounted in facing relation and conveniently moveable relative to one another, e.g., the upper platen 12 moveable toward and away from the stationary lower platen 14 to press an acrylic member therebetween. A carrier member 16 is positioned upon the upwardly facing surface of the lower pressing platen 14, and a subassembly 20 formed of a lower pressing plate 22, an acrylic blank 24, and an upper pressing plate 26 is positioned thereon. The upper platen 12 and lower platen 14 are then generally biased one toward the other, either to impress an optically smooth surface onto the acrylic blank 24 during a press-polishing mode of operation, or to generate a thickness reduction in the acrylic blank 24 in a press-stretching mode of operation.

The invention will be more fully described as it relates to the press-stretching mode of operation which is illustrated in FIG. 1, although it is to be understood that the invention is not limited thereto. In sequential order, a blank 24 of plastic sheet, e.g., acrylic, is preheated in an oven to its softening temperature range, e.g., about 300° F. (150° C.), for between about a ¾ hour to about a 3 hour period. The carrier member 16 and pressing plates 22 and 26 are also preheated to a comparable temperature, and a lubricant film, e.g., polytetrafluoroethylene in a colloidal dispersion sold under the trademark Mold-Wiz F-57 by Axel Plastics Research Lab, Inc., is applied to both major surfaces of the pressing plates 22 and 26. Upon reaching the desired temperature conditions, the carrier 16 is positioned between the platens 12 and 14, and the preheated and lubricated sandwich 20 is positioned atop the carrier 16. The upper platen 12 is biased downwardly from its rest position (shown in solid in FIG. 1) toward its pressing position (shown in phantom) to exert between about 300 pounds per square inch (p.s.i.) ($2.1 \times 10^6$ pascal) and about 500 p.s.i. ($3.5 \times 10^6$ pascal) pressure upon the acrylic blank 24. The acrylic blank 24 gradually undergoes a thickness reduction and a corresponding length and width increase, and the pressure is maintained for a time and at a magnitude to produce desired physical characteristics, e.g., about 15-20 minutes of 400 p.s.i. (2.8×10⁶ pascal) pressure. The reduced-thickness acrylic blank 24 is maintained under pressure and controllably cooled to a temperature below its softening temperature to preserve the desired final physical characteristics and avoid the affects of "plastic memory", e.g., for about 15 minutes to a temperature of about 150° F. (65° C.). Additional details of the press-stretching process may be found in U.S. Pat. No. 3,632,841 to Fortin, which is hereby incorporated by reference. After the cooling process is completed, the pressing assembly, i.e., carrier 16 and pressing plates 22 and 26, are cleaned of residual lubricant and relubricated in preparation for a subsequent pressing cycle.

As before mentioned, the pressing plates 22 and 26 are commonly formed of glass which is tempered for increased strength and durability. Prior to the present invention, such tempered glass pressing plates have been utilized with their peripheral edges exposed during all phases of the press-stretching operation, and it has been known to happen that the pressing plates break, most commonly while pressure is being applied thereto. In such an event, the tempered glass pressing plate fragments into a large number of relatively small particles, e.g., ½ inch (1.25 cm.) in diameter, a substantial number of which are forcefully expelled outwardly from the peripheral edge of the pressing plate.

With reference to FIGS. 1-4, the present invention provides facilities for obviating the above-discussed difficulty, in the form of a peripheral edge-containing member 30, which is secured about the periphery of each tempered pressing plate to retain particles of fragmented glass within a localized area during inadvertent breakage of the pressing plate.

Figure 2:
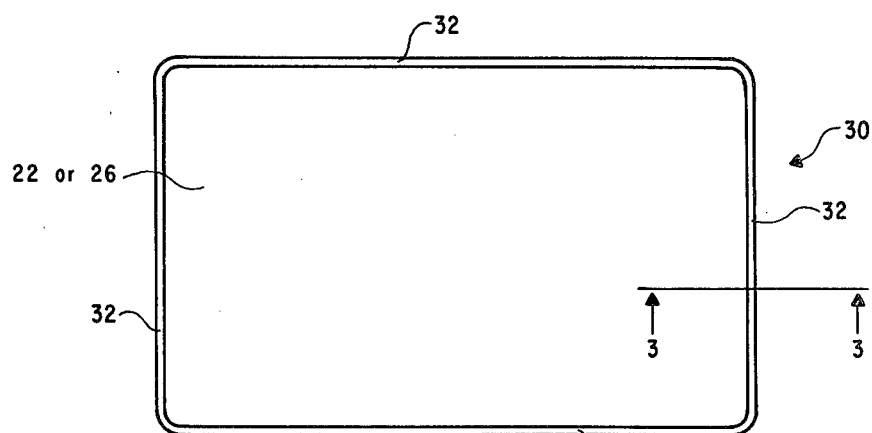
FIG. 2 is a plan view of a pressing plate forming a portion of the apparatus of FIG. 1, incorporating features of the present invention.
Figure 3:
FIG. 3 is an enlarged sectional view taken along line 3—3 of FIG. 2 showing the peripheral edge of a pressing plate, including an edge-containing element incorporating features of the present invention.

With particular reference to FIGS. 2 and 3, the edge-containing member 30 may take the form of a continuous bead 32 of an elastomeric material secured to the peripheral edge of the pressing plate 22 or 26. Preferably, the bead 32 is applied to the peripheral edge to completely cover same, while avoiding engagement with the marginal edge portions of the pressing plate 22 or 26, to avoid introducing any foreign body onto the major surfaces of the pressing plates 22 or 26 which might generate a nonuniform pressure condition. As shown in FIG. 3, the bead 32 may be conveniently formed in a generally semi-circular shape when viewed in cross-section by the use of an appropriate rounded template tool. Preferably the bead 32 is formed of a material which is able to withstand repeated temperature cycling in the applicable temperature range, which adheres strongly to glass, which cures quickly to a non-tacky finish, and which is economically attractive. Although not limiting to the invention, useful elastomeric materials may include silicone adhesives and sealants, polysulfide adhesives and sealants, structural elastic hot melts, or polyurethane adhesives.

Figure 4:
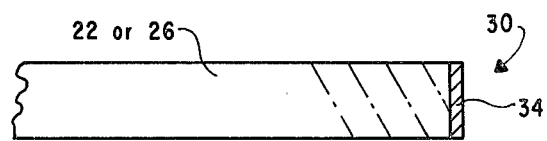
FIG. 4 is a view similar to the view in FIG. 3, illustrating an alternative embodiment of the invention.

With reference to FIG. 4, another embodiment of the present invention is shown, including an edge-containing member 30 taking the form of a layer 34, e.g., between about 0.005 inch (0.013 cm.) to 0.016 inch (0.04 cm.) thick, of an appropriate paint. As it is the object of the present invention to diminish or eliminate the expulsion of fragmented particles from the peripheral edge of the pressing plates 22 or 26, it has been determined that the peripheral edge of the pressing plates 22 or 26 may be conveniently painted to reduce the length of the projectile path of fragmented particles. Again it is preferred that superior temperature cycling properties and glass adhesion properties be provided in the paint selected for use in this embodiment of the invention.

Although not limiting to the invention, paints which may be found useful in the practice of the present invention may include latex paints, epoxy-based paints, and preferably elastomeric polyurethane based coatings such as those taught in U.S. Pat. Nos. 3,912,790 and 4,147,679, which teachings are incorporated herein by reference.

With continued reference to FIG. 4, the edge-containing member 30 may take the form of a layer of adhesive tape applied in a continuous manner to the peripheral edge of the pressing plates 22 or 26. Preferably the tape selected would exhibit superior temperature cycling properties, would adhere well to glass, and preferably would be resilient.

Although not limiting to the invention, tapes which may be found useful in the practice of the present invention may include polyester tapes, a polyethylene tape having an acrylic adhesive such as the one available from the Venture Tape Corporation of Randolph, Massachusetts as 910, and selected metal-backed tapes.

As will be better appreciated from a consideration of the experimental work set forth in the following Examples, it is expected that the elastomeric materials will be preferred in the practice of the present invention, although each of the embodiments disclosed herein may be practiced to advantage.

EXAMPLE I

A 12 inch (30.5 cm.)×12 inch (30.5 cm.)×0.5 inch (1.25 cm.) flat glass plate was thermally tempered and placed centrally within an open-topped compartment having bottom dimensions of about 24 inches (61 cm.)×36 inches (91.5 cm.). The peripheral edges of the glass plate were left exposed and untreated. A planar sheet was placed over the exposed major surface of the glass plate to simulate the sandwich condition which exists during a press-stretching operation, and the planar sheet was struck near its center with one end of a 3 lb. (1.36 kg.) metal bar with a force sufficient to fracture the underlying glass plate. A large number of small glass particles were expelled outwardly, confined along the plane of the major surfaces of the plate by the sandwich condition, and some had velocity sufficient to bombard all walls of the compartment in which the glass plate was contained. Example I illustrates the condition which exists absent the practice of the present invention, and will be used for comparison purposes hereinafter.

EXAMPLE II

A tempered flat glass plate of the type utilized in Example I had its peripheral edges wrapped by a single 0.002 inch (0.005 cm.) thick layer of polyester tape having a silicone adhesive on one side thereof available from the 3M Company as 8403. The taped-edge glass plate was positioned and sandwiched in the compartment and fractured by a blow with the end of the metal bar as in Example I. Upon fracture, the plate fragmented into a large number of relatively small particles, and the polyester tape severed at one point along its length, permitting a number of glass particles to be expelled outwardly in three directions, but restricting the expulsion of glass particles in the direction toward the peripheral edge opposite the position of tape breakage. Thus, three of the compartment walls were bombarded with glass particles, while one was protected by the polyester tape. Thus, an appropriate tape may prove useful in the practice of the present invention, particularly if the tape can be prevented from severing at a point.

EXAMPLE III

A tempered glass plate as in Examples I and II had a single layer of latex poster paint, available from Leisure Crafts, Co., of Compton, California under the trademark Leisure Tone, applied and dried upon its peripheral edge. The plate was positioned in the compartment as in the previous Examples and was fractured by a blow with the metal bar near its center, as before. Upon fracture, the plate was fragmented into a large number of relatively small particles which were expelled outwardly along the plane of the major surface of the sheet, but the projectile path of the expelled glass particles was substantially shorter than those of Examples I and II, none reaching the walls of the compartment. The expelled glass particles finally formed a substantially square array of glass particles in the bottom of the compartment measuring about 21.3 inches (54 cm.)×21.3 inches (54 cm.).

EXAMPLE IV

A tempered glass plate as in the previous Examples had two of its peripheral edges coated with a bead of GE RTV Clear Silicone Rubber Adhesive Sealant #108, which was cured thereon, and two of its peripheral edges coated with a layer of a sealant available from Products Research Manufacturing of Glendale, California as PR1221-B ½. As in the previous Examples, the plate was positioned in the compartment and fractured by a blow near its center. Upon fracture, the plate fragmented into a large number of relatively small particles, but the glass particles were retained substantially intact by the edge-containing function of the silicone adhesive and sealant layers. Only a very few glass particles were actually expelled from the fractured glass plate, and the intact but fractured plate was expanded only slightly from its original 12 inch×12 inch dimension. Additionally, no significant difference could be noted between the final condition of the silicone adhesive-coated edges and the sealant-coated edges. In practice, however, the silicone adhesive is generally preferred due to its quick cure time and excellent adhesion to glass.

Of course the invention is not intended to be limited by the specific embodiments disclosed in the Examples, but rather, only by the claims which follow.

I claim:

1. An apparatus for applying pressure to opposed major surfaces of a plastic sheet, comprising a pair of complementarily shaped pressing plates and means for biasing said pair of pressing plates toward one another with a selected pressing force to press said plastic sheet therebetween, wherein at least one of said pressing plates is formed of a fracturable material having at least a partially exposed peripheral edge during pressing such that when said at least one pressing plate is broken pressing particles thereof are expelled outward from said at least partially exposed peripheral edge along a projectile path having a measurable length, wherein the improvement comprises:

means secured to at least portions of the exposed peripheral edge of said at least one pressing plate for containing said peripheral edge to reduce the length of said projectile path of said outwardly expelled particles.

2. The apparatus as set forth in claim 1 wherein said at least one sheet is formed of tempered glass having an optically smooth surface facing and to be impressed upon said plastic sheet during pressing.

3. The apparatus as set forth in claim 1 wherein said containing means comprises:

a peripheral bead of an elastomer material adhered to said peripheral edge.

4. The apparatus as set forth in claim 3 wherein said elastomer material is selected from the group consisting of silicone adhesives and sealants, polysulfide adhesives and sealants, structural elastic hot melts, and polyurethane adhesives.

5. The apparatus as set forth in claim 3 or 4 wherein said bead is thickest adjacent the central portions of said peripheral edge and thinnest adjacent the outer portions of said peripheral edge, when viewed in cross-section.

6. The apparatus as set forth in claim 1 wherein said containing means comprises:

a layer of paint dried upon said peripheral edge.

7. The apparatus as set forth in claim 1 wherein said containing means comprises:

a layer of adhesive tape secured upon said peripheral edge.

8. In a method of applying pressure to opposing major surfaces of a plastic sheet, comprising the steps of positioning a plastic sheet between a pair of complementarily shaped pressing plates and biasing said pressing plates toward one another to press said plastic sheet therebetween, wherein at least one of said pressing plates is formed of a fracturable material and has at least a partially exposed peripheral edge during pressing such that if said fracturable pressing plate is broken during pressing particles thereof are expelled outward from said at least partially exposed peripheral edge along a projectile path having a measurable length, wherein the improvement comprises the steps of:

securing a particle retaining layer on at least portions of the peripheral edge of said fracture pressing plate to reduce the length of said projectile path.

9. The method as set forth in claim 8 wherein said particle retaining layer is localized to only said peripheral edge of said fracturable pressing plate.

10. The method as set forth in claim 8 wherein said particle retaining layer is formed of an elastomeric material selected from the group consisting of silicone adhesives and sealants, polysulfide adhesives and sealants, structural elastic hot melts, and polyurethane adhesives.

11. The method as set forth in claim 8 wherein said particle retaining layer is formed of a layer of paint.

12. The method as set forth in claim 8 wherein said particle retaining layer is formed of tape applied to said peripheral edge.

* * * * *

UNITED STATES PATENT AND TRADEMARK OFFICE
CERTIFICATE OF CORRECTION

PATENT NO. : 4,360,483

DATED : November 23, 1982

INVENTOR(S) : Ronald L. Ayres

It is certified that error appears in the above-identified patent and that said Letters Patent are hereby corrected as shown below:

Column 5, line 60, --during-- should be inserted after "broken".

Signed and Sealed this

Eighth Day of March 1983

[SEAL]

Attest:

GERALD J. MOSSINGHOFF

Attesting Officer    Commissioner of Patents and Trademarks